(12) United States Patent
Kuhns (10) Patent No.: US 11,358,079 B2
(45) Date of Patent: Jun. 14, 2022

(54) FLUID SYSTEM WITH FILTER DIFFERENTIAL PRESSURE CONTROL

(71) Applicant: EATON INTELLIGENT POWER LIMITED, Dublin (IE)

(72) Inventor: Matthew M. Kuhns, Santa Clarita, CA (US)

(73) Assignee: Eaton Intelligent Power Limited, Dublin (IE)

( * ) Notice: Subject to any disclaimer, the term of this patent is extended or adjusted under 35 U.S.C. 154(b) by 278 days.

(21) Appl. No.: 15/863,171

(22) Filed: Jan. 5, 2018

(65) Prior Publication Data
US 2018/0185775 A1 Jul. 5, 2018

Related U.S. Application Data

(60) Provisional application No. 62/442,624, filed on Jan. 5, 2017.

(51) Int. Cl.
| | |
|---|---|
| *B01D 35/143* | (2006.01) |
| *B01D 35/157* | (2006.01) |
| *F02M 37/22* | (2019.01) |
| *F02M 37/00* | (2006.01) |
| *B01D 29/60* | (2006.01) |
| *F02M 37/40* | (2019.01) |

(52) U.S. Cl.
CPC ......... *B01D 35/143* (2013.01); *B01D 29/606* (2013.01); *B01D 35/1573* (2013.01); *F02M 37/0047* (2013.01); *F02M 37/40* (2019.01); *B01D 2201/54* (2013.01)

(58) Field of Classification Search
CPC .......................... B01D 35/143; B01D 35/1573; B01D 35/157; B01D 29/606; B01D 2201/54; B01D 35/1435; F02M 37/0047; F02M 37/22; F02M 37/00; F02M 37/40; F02M 37/0023; F02M 37/32; B65B 1/04; G05D 7/06; G06F 3/048; G01F 1/50; G01F 15/063
USPC ....................................................... 210/741
See application file for complete search history.

(56) References Cited

U.S. PATENT DOCUMENTS

| | | | |
|---|---|---|---|
| RE28,109 E | 8/1974 | Provenzano, Jr. | |
| 4,330,828 A | 5/1982 | Smith et al. | |
| 4,452,207 A | 6/1984 | Moore, Jr. | |
| 6,317,680 B1 | 11/2001 | Luttrell et al. | |
| 7,359,777 B2 | 4/2008 | Betters et al. | |
| 7,765,978 B2 * | 8/2010 | Ruesch | F02D 17/00 123/198 D |
| 8,616,066 B2 | 12/2013 | Sprenger et al. | |
| 2011/0154242 A1 * | 6/2011 | Stevens | G05D 7/06 715/771 |
| 2017/0173505 A1 * | 6/2017 | Dhingra | F02M 37/28 |

* cited by examiner

*Primary Examiner* — Akash K Varma
(74) *Attorney, Agent, or Firm* — Merchant & Gould P.C.

(57) ABSTRACT

A fluid system includes a fluid valve, a fluid filter connected to the fluid valve, a first pressure sensor in fluid communication the fluid filter, a second pressure sensor disposed downstream of the fluid filter, and a controller configured to determine a condition of the fluid filter according to information from the first pressure sensor and the second pressure sensor. The controller may be configured to control operation of the fluid valve according to the condition of the fluid filter and the information from the first pressure sensor and the second pressure sensor. Methods for controlling a fluid system are also disclosed.

21 Claims, 6 Drawing Sheets

FLUID SYSTEM WITH FILTER DIFFERENTIAL PRESSURE CONTROL

CROSS-REFERENCE TO RELATED APPLICATION

This application claims the benefit of U.S. Provisional Patent Application Ser. No. 62/442,624, filed on Jan. 5, 2017, the disclosure of which is hereby incorporated herein by reference in its entirety.

TECHNICAL FIELD

The present disclosure relates to fluid systems, including fluid systems having filters and controlling fluid pressures in such systems.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Fluid systems, such as fueling systems, may include some form of filter or filtration component. In certain applications, it may be desirable to monitor the filter.

There is a desire for solutions/options that minimize or eliminate one or more challenges or shortcomings of fluid systems. The foregoing discussion is intended only to illustrate examples of the present field and should not be taken as a disavowal of scope.

SUMMARY

In embodiments, a fluid system may include a fluid valve, a fluid filter connected to the fluid valve, a first pressure sensor in fluid communication with the fluid filter, a second pressure sensor disposed downstream of the fluid filter, and/or a controller configured to determine a condition of the fluid filter according to information from the first pressure sensor and the second pressure sensor. A controller may be configured to control operation of the fluid valve according to the condition of the fluid filter and the information from the first pressure sensor and the second pressure sensor.

With embodiments, a method of controlling a fluid system may include providing a fluid system. A fluid system may include a fluid valve, a fluid filter connected to the fluid valve, a first pressure sensor in fluid communication with the fluid filter and disposed upstream of the fluid filter, a second pressure sensor disposed downstream of the fluid filter, and/or a controller. The method may include determining a differential pressure via the first pressure sensor and the second pressure sensor, comparing the differential pressure to a first limit, determining a correction factor, determining a corrected differential pressure based, in part, on the correction factor; comparing the corrected differential pressure to a second limit, controlling the fluid valve to reduce the corrected differential pressure if the corrected differential pressure is not within the second limit, and/or determining a remaining life of the fluid filter if the corrected differential pressure is within the second limit.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Fluid filters in fluid systems may be configured as a filter separator (e.g., 2-stage, water removing) and/or a monitor (e.g., single stage, water absorbing). In some applications, the filters and their elements may be designed, tested, and manufactured to certain standards (e.g., Energy Institute or "EI" 1581 and EI 1583). The differential pressure (DP or $\Delta P$) across the filter (e.g., the difference between the fluid pressure at the inlet to the filter and the fluid pressure at the outlet of the filter) may be used as an indication of the condition of the filter elements. An initial DP may be in the range of about 1 PSID to 3 PSID (pounds per square inch differential), for example and without limitation. As particulate and/or water accumulate in or around the filter, the DP may increase. During a typical lifecycle (e.g., about 1 year), the DP may generally not exceed 5 or 6 PSID. If the DP climbs quickly, significant contamination may have occurred and it may be desirable to closely monitor the filter. If the DP drops quickly, the filter elements may have ruptured. Measuring a DP may include obtaining data from both sides of the fuel filter and/or compensating for flow effects to determine a true pressure drop.

Figure 1:
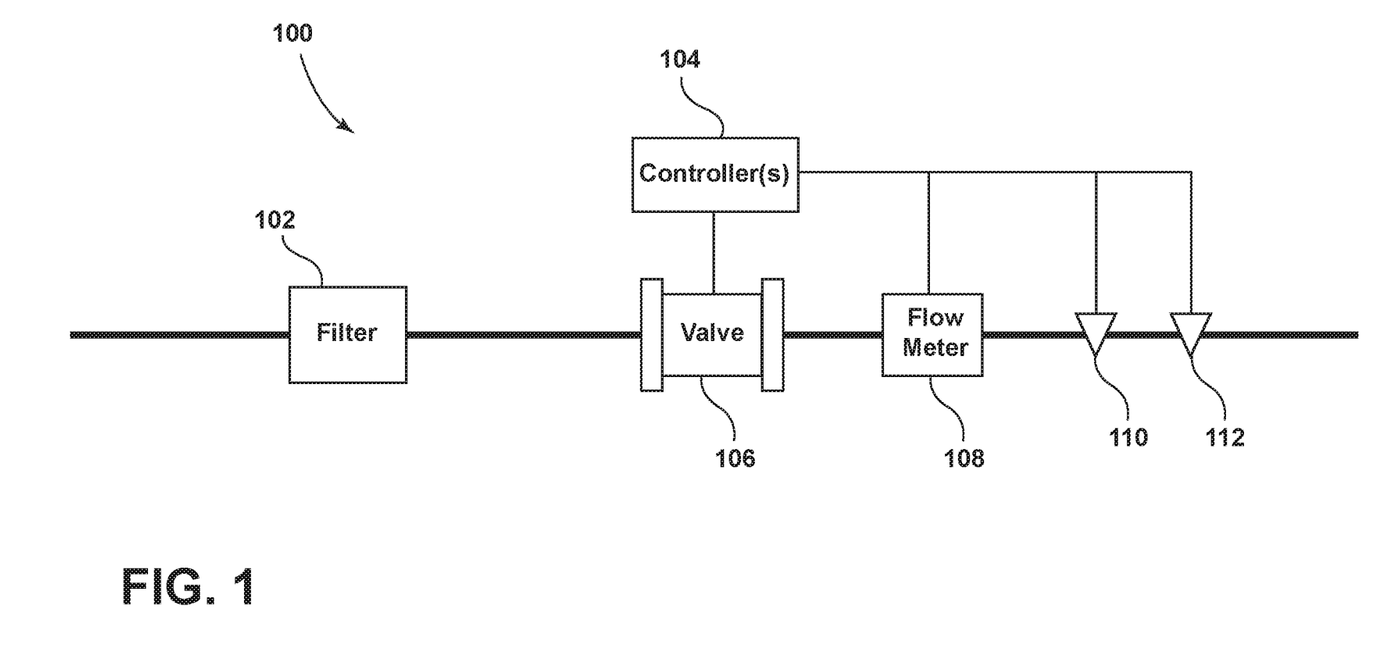
FIG. 1 is a schematic view of a fluid system.

Referring to FIG. 1, a first fluid system 100 is generally illustrated. The first fluid system 100 may include a filter 102 (e.g., a fluid filter), a controller 104, a valve 106 (e.g., a fluid valve), a flow meter 108, and/or one or more pressure sensors (e.g., pressure transducers 110, 112). The controller 104 may control operation of the valve 106 according to information received from the flow meter 108 and/or the pressure transducers 110, 112 (e.g., data, signals, values, and/or similar information that may correspond to fluid flow rates and/or fluid pressure). The pressure transducers 110, 112 may both be disposed downstream of the flow meter 108, which may be disposed downstream of the valve 106, which may be disposed downstream of the filter 102. Such a configuration may not permit measurement of a differential pressure at or across the filter 102.

Figure 2:
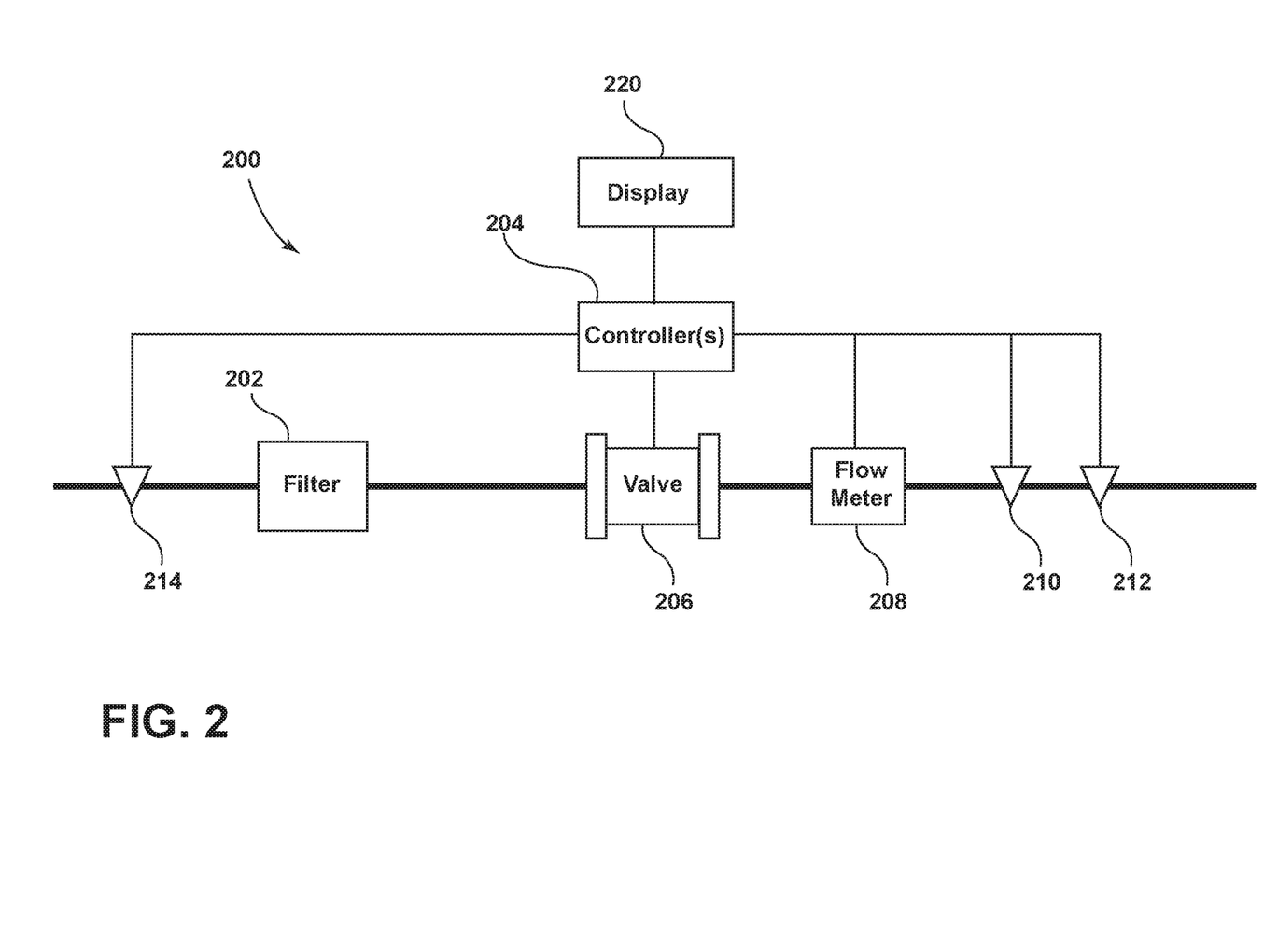
FIG. 2 is a schematic view of an embodiment of a fluid system in accordance with teachings of the present disclosure.

Referring to FIG. 2, a second fluid system 200 is generally illustrated. The second fluid system 200 may be configured in a similar manner as the first fluid system 100, and may include a filter 202, a controller 204, a valve 206, a flow meter 208, one or more pressure sensors (e.g., pressure transducers 210, 212), and/or a display 220. A second fluid system 200 may include a pressure sensor 214 upstream of the filter 202. For example and without limitation, a second fluid system 200 may, as generally illustrated in FIG. 2, include a first pressure sensor that is upstream of a filter 202 (e.g., pressure sensor/transducer 214), and a second pressure sensor that is downstream of the filter 202 (e.g., pressure sensor/transducer 210 or 212). The controller 204 may be configured to estimate a filter DP according to information from the upstream pressure sensor 214, one or both of the downstream (e.g., downstream of the flow meter 208 and the valve 206) pressure transducers 210, 212, and/or the flow meter 208. If the filter 202 is in an unclogged state/condition, there may be an expected pressure drop. The expected pressure drop may be determined, for example, via calibration, which may include compensating for various flow rates.

Figure 3:
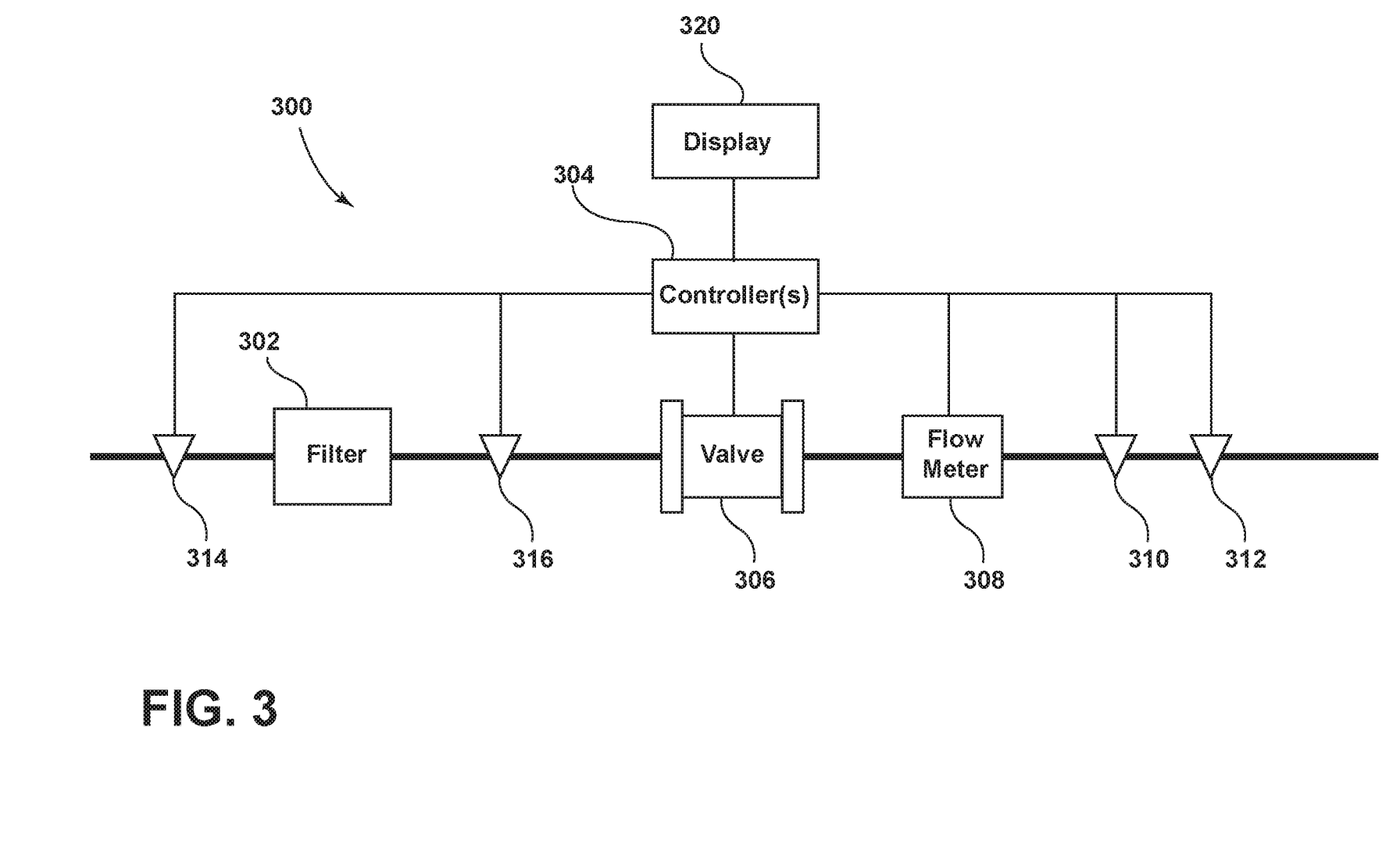
FIG. 3 is a schematic view of an embodiment of a fluid system in accordance with teachings of the present disclosure.

Referring to FIG. 3, a third fluid system 300 is generally illustrated. The third fluid system 300 may be configured in a similar manner as the second fluid system 200, and may include a filter 302, a controller 304, a valve 306, a flow meter 308, one or more pressure sensors (e.g., pressure transducers 310, 312 that may be disposed downstream of the valve 306 and/or a pressure transducer 314 that may be disposed upstream of the filter 302), and/or a display 320. A third fluid system 300 may include a pressure sensor 316 between the filter 302 and the valve 306 (e.g., downstream of the filter 302 and upstream of the valve 306). In such configurations, the third fluid system 300 may include a first pressure sensor/transducer 314 at or near the inlet of the filter 302 (upstream) and a second pressure sensor/transducer 316 at or near the outlet of the filter 302 (downstream). With reference to the embodiment generally illustrated in FIG. 3, a third fluid system 300 may, for example and without limitation, include a third pressure sensor/transducer and/or a fourth pressure sensor/transducer (which may correspond to pressure sensor/transducer 310 and/or 312, respectively). Such a configuration may permit the controller 304 to directly calculate (e.g., not estimate) the DP across the filter 302.

With embodiments, a controller (e.g., controllers 204, 304) may be configured to determine a flow-compensated DP across the filter. For example, and without limitation, the controller 204, 304 may be configured to determine a flow-compensated DP according to the following equation:

$$\text{Flow Comp } \Delta P = \\ \beta + PSI * \left(2.237 * 2.718^{-0.00896\left(\frac{Max}{Actual}*100\right)} + 9.638 * \\ 2.718^{-0.04719\left(\frac{Max}{Actual}*100\right)}\right).$$

Eq. 1

Where β corresponds to a pressure drop correction factor between the pressure sensors and the filter 202, 302, Actual corresponds to a measured flow rate (e.g., via the flow meter), Max corresponds to a maximum flow rate, and PSI corresponds to a measured differential pressure (e.g., the absolute value of the difference between a pressure measurement P1 from an upstream pressure transducer 314 and a pressure measurement P2 from a downstream pressure transducer 316).

Figure 4:
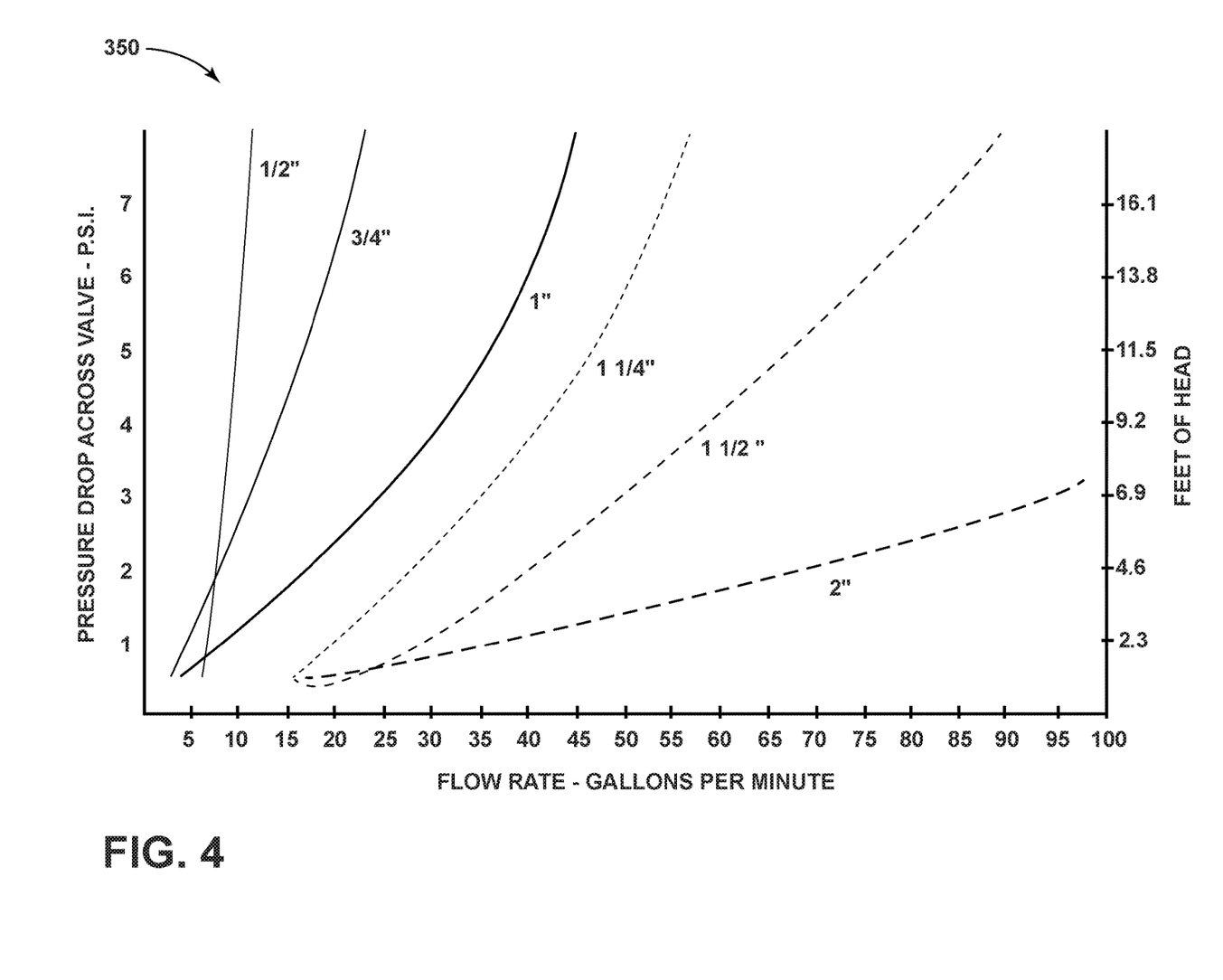
FIG. 4 is a graphical view of flow rate relative to pressure drop and feet of head.

Referring to FIG. 4, an example of a chart 350 that may be used in calculating β is generally illustrated. The value of β may be used in connection with the second fluid system 200 and/or the third fluid system 300 and may vary by system setup. If pressure sensors (e.g., pressure sensors 314, 316) are sufficiently close to a filter 202, 302 (e.g., the inlet and outlet of the filter 302, respectively), β may be assumed to be effectively zero. Alternatively, with embodiments, if pressure sensor 314 and/or the pressure transducer 316 are sufficiently close to the filter, Equation 1 may be simplified as follows:

$$\text{Flow Comp } \Delta P = \beta * \left(2.237 * 2.718^{-0.00896\left(\frac{Max}{Actual}*100\right)} + \\ 9.638 * 2.718^{-0.04719\left(\frac{Max}{Actual}*100\right)}\right).$$

Eq. 2

Where Max corresponds to a maximum safe flow rate, and PSI equals the absolute value of the difference between P2 and P1. A correction factor β may be determined according to the following:

$$\beta = (0.25 + PSI^2), PSI < 3 \text{ psi}$$

Eq. 3.

$$0 = (PSI - 0.5), PSI \geq 3 \text{ psi}$$

Eq. 4.

With embodiments, the first pressure sensor 314 may not be disposed/connected immediately upstream of the filter 302 and may be disposed at a distance depending on the configuration of the system (e.g., installation location). The correction factor β may be configured to compensate for any pressure drop between the filter 302 and the pressure sensor 314.

In embodiments, a controller 204, 304 may be configured to compensate for top off events (e.g., for filter life or filter failure calculations). Top off events may not include a power cycle and/or may not include nozzle stowage. A fueling cycle/event may include a complete event plus any top off, and may include both fluid flow and pressure in the system. In some cases there may be multiple top off events and in other cases there may not be any top off events.

With embodiments, a controller 204, 304 may not register a fuel cycle event (e.g., for filter life or filter failure calculations) if the fueling event is less than a certain amount of time (e.g., one minute) and/or if the maximum flow rate was below a certain percentage (e.g., 50%) of a maximum flow threshold that may be used for reliable corrected differential pressure calculations.

In embodiments, a controller 204, 304 may be configured to stop operation of a fluid system 200, 300 if the corrected differential pressure is outside certain limits (e.g., as specified via Air Transport Association of America or "ATA" Specification 103). Differential pressure limits may vary depending on the type of filter, and the controller 204, 304 may be configured to receive information regarding the limits and/or the type of filter being used.

With embodiments, a controller 204, 304 may be configured to detect a filter rupture. Filter rupture may be detected via a rapid change (e.g., a decrease) in the differential pressure (e.g., actual and/or corrected). In some circumstances, a complete filter failure may result in a differential pressure below a level expected for a new filter (e.g., about 3 psi) and may be detected via a lower threshold or limit. For example and without limitation, a full failure may be detected if the corrected differential pressure is less than correction factor β plus 5 psi (or some other threshold of either corrected or uncorrected differential pressure depending on what type of filter is used).

Additionally or alternatively, a controller 204, 304 may be configured to detect a partial failure of the filter 302. For example and without limitation, the controller 204, 304 may detect a partial failure if the following relationship is true:

$$\left| \frac{\Delta P_t - \Delta P_{t-1}}{\Delta P_t - \Delta P_{t-10}} \right| < z \text{ AND } |\text{Flow}_t - \text{Flow}_{t-10}| < 20 \text{ gpm}. \quad \text{Eq. 5}$$

With embodiments, z may be determined via calibration/experimentation based on system response rates to filters 302 of varying pressure drops, but may be about, for example, 0.3 psi. Flow rates $\text{Flow}_t$ and $\text{Flow}_{t-10}$ may be checked first to prevent division by 0 if $\Delta P_t = \Delta P_{t-10}$.

In embodiments, if the current corrected differential pressure is more than a threshold amount (e.g., about 5 psi) below the max corrected differential pressure of the last fueling event in which a flow rate greater than 50% was achieved, a controller 204, 304 may detect a filter failure. The controller 204, 304 may be configured to record the failure in a fault log and cause a display 220, 320 to show a failure message for a certain amount of time (e.g., 5 minutes) and/or until a power cycle occurs. The controller 204, 304 may prevent a system restart until a fault indication/flag is removed (removal may require elevated permissions), such as after the filter 202, 302 is replaced.

In embodiments, a controller 204, 304 may be configured to down throttle flow in a system 200, 300 if a high differential pressure is detected. Down throttling flow may help avoid rupturing of the filter 202, 302. If high differential pressure is detected, the controller 204, 304 may decrease the maximum allowable pressure and/or may flag the filter for replacement. Decreasing the flow may include calculating a projected flow using reverse computation via Equation 1, above. A certain amount of flow (e.g., 50 gallons per minute or "gpm") may be subtracted from that projected flow to determine a new throttled flow limit. The controller 204, 304 may set the throttled flow limit as the system flow limit for the duration of the fueling event. If the throttled flow limit is below a threshold (e.g., 50 gpm), the controller may stop the fueling event. If certain differential pressure levels are reached (e.g., 15 or 22 psi), the controller 204, 304 may stop the fueling event immediately and/or may not permit further operation until the filter 202, 302 is replaced.

A controller 204, 304, with embodiments, may be configured to estimate a remaining life of a filter 202, 302. For example and without limitation, a remaining life of a filter 202, 302 with a 15 psi replacement value may be calculated via the following equation:

$$\text{Remaining Life} = -\left(\frac{\delta}{\alpha - \gamma}\right) * (-15 \text{ psi} + \alpha). \quad \text{Eq. 6}$$

Where $\delta$ corresponds to a number of fueling cycles between two readings (e.g., five cycles), $\alpha$ corresponds to a maximum corrected differential pressure during current fueling, and $\gamma$ corresponds to a maximum corrected differential pressure during all fueling.

In embodiments, a fluid system 200, 300 may be configured for use with other fueling systems and/or may be configured to provide emergency shut down or flow throttling via an in-line valve or hydrant coupler. Log files may be downloaded and may be customized (e.g., via controller 204, 304). For example and without limitation, log files may include a maximum differential pressure, a flow rate at the maximum differential pressure, a maximum corrected/compensated differential pressure, and/or a flow rate at the maximum corrected/compensated differential pressure.

Figure 5:
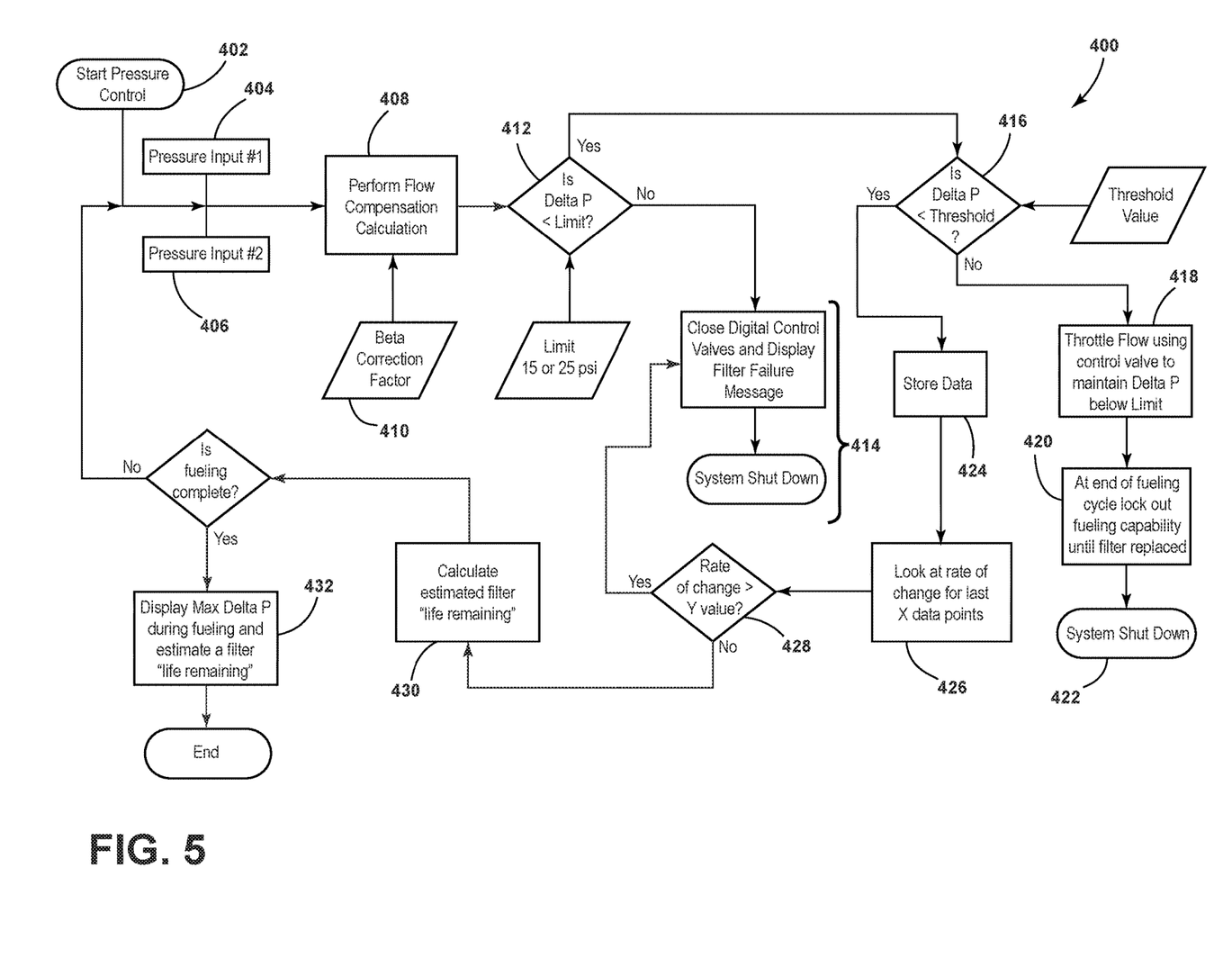
FIG. 5 is a flow diagram of an embodiment of a method of controlling a fluid system in accordance with teachings of the present disclosure.

As generally illustrated in FIG. 5, an embodiment of a method 400 of controlling pressure in a fluid system 200, 300 may include starting pressure control (step 402), and receiving a first pressure input P1 (e.g., from a first pressure transducer 214, 314 upstream of the filter 202, 302)(step 404) and/or receiving a second pressure input P2 (e.g., from a second pressure transducer downstream 316 of the filter 202, 302)(step 406). A controller 204, 304 may perform a flow compensation calculation to determine a compensated differential pressure (step 408), which may include obtaining a correction factor β (step 410). The controller 204, 304 may compare the compensated differential pressure to one or more limits (e.g., an upper limit of 15 or 22 psi)(step 412). If the compensated differential pressure is not within the one or more limits, the controller 204, 304 may close the control valve 206, 306, display a filter failure message (e.g., on a display 220, 320), and/or shut down the system (step 414). If the compensated differential pressure is within the one or more limits, the controller 204, 304 may compare the compensated differential pressure to a threshold (step 416). If the compensated differential pressure is above the threshold, for example, the controller 204, 304 may throttle fluid flow via the control valve 206, 306 (step 418), which may maintain differential pressure below the one or more limits. At the end of the fueling event, the controller 204, 304 may lock out/prevent additional fueling events until the filter is replaced (step 420) and/or may shut down the system 200, 300 (step 422).

With embodiments, if the compensated differential pressure is at or below the threshold, for example, a controller 204, 304 may store data about the current fueling event (e.g., first pressure input, second pressure input, corrected differential pressure, flow rate, etc.)(step 424). The controller 204, 304 may then determine a rate of change for one or more values (e.g., corrected differential pressure) from previous values (step 426). If the rate of change is greater than a change threshold (step 428), the controller 204, 304 may, for example, detect that a filter rupture/failure is imminent, close the control valve 206, 306, display a failure message, and/or shut down the system 200, 300 (step 414). If the rate of change is less than a threshold (step 428), the controller 204, 304 may determine/calculate an estimated remaining life for the filter 202, 302 (step 430). If fueling continues, the method 400 may loop/continue (e.g., obtain first and second pressure inputs, calculate compensated differential pressure, etc.). If fueling is complete, the controller 204, 304 may display certain information (step 432), such as, for example, a maximum differential pressure during the fueling event and/or an estimated remaining life of the filter.

Figure 6:
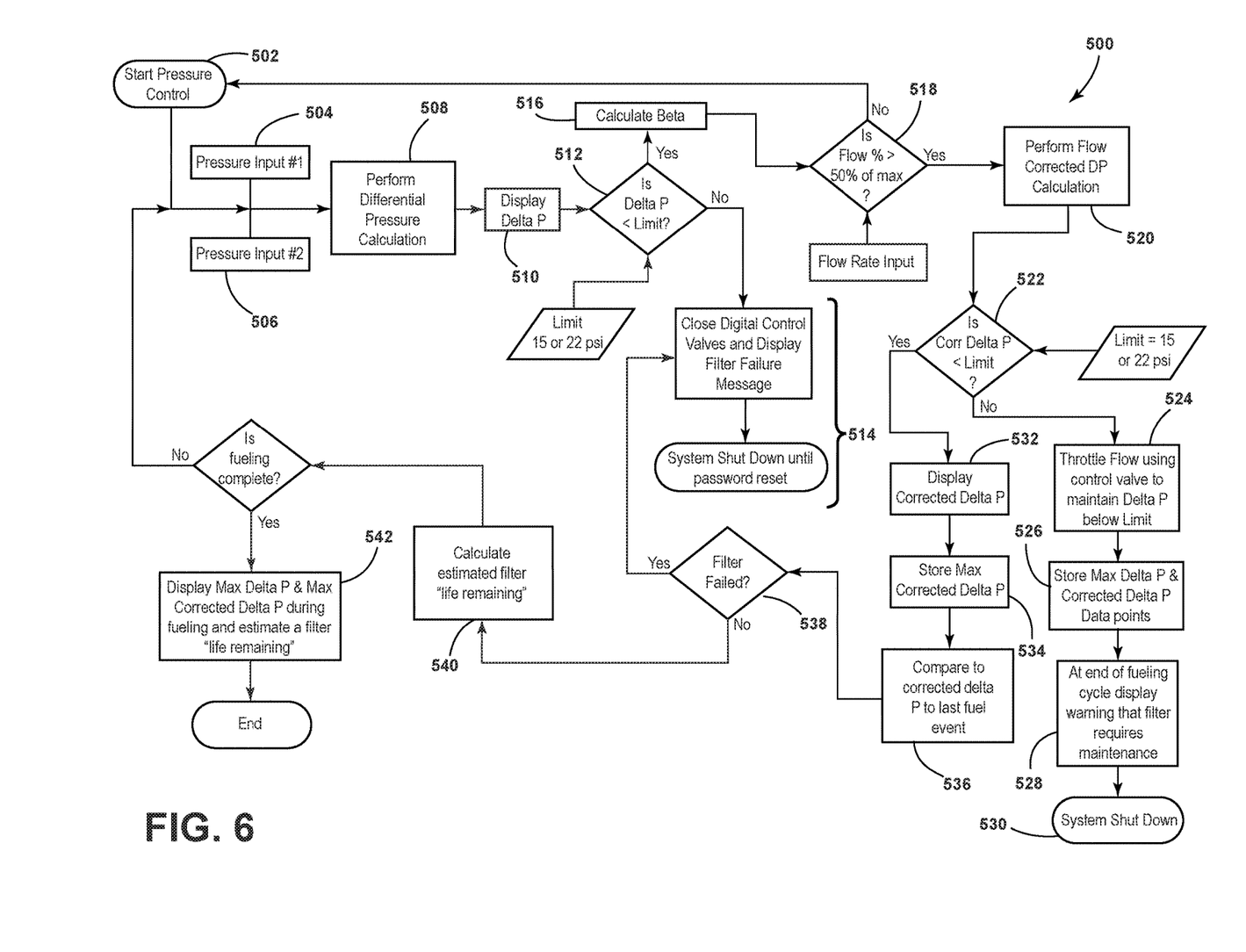
FIG. 6 is a flow diagram of an embodiment of a method of controlling a fluid system in accordance with teachings of the present disclosure.

As generally illustrated in FIG. 6, an embodiment of a method 500 of controlling a fluid system 200, 300 may include starting pressure control (step 502) and receiving a first pressure input P1 (e.g., from a first pressure transducer 214, 314)(step 504) and/or receiving a second pressure input P2 (e.g., from a second pressure transducer 316)(step 506). A controller 204, 304 may calculate a differential pressure from the first and second pressure inputs P1, P2 (step 508) and may display the differential pressure (510). The controller 204, 304 may compare the differential pressure to one or more limits (step 512). If the differential pressure is not within the one or more limits, the controller 204, 304 may close the control valve 206, 306, display a filter failure message, and/or shut down the system 200, 300 (step 514).

With embodiments, if the differential pressure is within the one or more limits (e.g., less than 15 or 22 psi), the controller 204, 304 may determine/calculate a correction factor β (step 516). If the current flow rate (e.g., as measured via the flow meter 208, 308) is less than a certain amount of a maximum flow rate (e.g., less than 50%), the method 500 may restart/loop. If the flow rate is above a certain amount of the maximum flow rate (e.g., at least 50%)(step 518), the controller 204, 304 may determine a compensated/corrected differential pressure (step 520). The controller 204, 304 may compare the corrected differential pressure to one or more limits (step 522), which may or may not be the same as the one or more limits to which the uncompensated differential pressure may have been compared in step 512.

In embodiments, if the corrected differential pressure is not within the one or more limits, the controller 204, 304 may throttle flow via a control valve 206, 306 and/or may maintain differential pressure below the limit (step 524). The controller 204, 304 may store one or more maximum differential pressure and/or maximum corrected differential values (step 526). At the end of the current fueling cycle, the controller 204, 304 may display a warning that the filter requires maintenance (step 528) and/or shut the system down (step 530).

With embodiments, if the corrected differential pressure is within the one or more limits, the controller 204, 304 may display (step 532) and/or store the corrected/compensated differential pressure (step 534). The controller 204, 304 may compare the corrected differential pressure with one or more previous fueling events and/or with previous data points from the current fueling event (step 536). The controller 204, 304 may determine whether the filter 202, 302 has failed (step 538). If the compensated differential pressure and/or a rate of change of the differential pressure is not within a certain range of the previous data, the controller 204, 304 may determine that the filter 202, 302 has failed, close the control valve 206, 306, display a filter failure message, and/or shut down the system 200, 300 (step 514). If the compensated differential pressure and/or a rate of change of the differential pressure is within the range of the previous data, the controller 204, 304 may calculate an estimated remaining life for the filter (step 540). If fueling continues, the method 500 may loop/continue (e.g., obtain first and second pressure inputs, calculate compensated differential pressure, etc.). If fueling is complete, the controller 204, 304 may display certain information (step 542), such as, for example, a maximum differential pressure during the fueling event, a maximum corrected differential pressure during the fueling event, and/or an estimated remaining life of the filter.

In embodiments, a controller (e.g., controllers 104, 204, 304) may include an electronic controller and/or include an electronic processor, such as a programmable microprocessor and/or microcontroller. In embodiments, a controller may include, for example, an application specific integrated circuit (ASIC). A controller may include a central processing unit (CPU), a memory, and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display (e.g., displays 220, 320), which may include a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

It should be understood that a controller (e.g., controllers 104, 204, 304), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM, RAM, a combination of non-volatile and volatile (modifiable) memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A fluid system, comprising:
   a fluid valve;
   a fluid filter connected to and disposed upstream of the fluid valve;
   a first pressure sensor in fluid communication with the fluid filter, the first pressure sensor disposed upstream of and at a distance from the fluid filter and the fluid valve;
   a second pressure sensor disposed downstream of and at a distance from the fluid filter; and
   a controller configured to determine a condition of the fluid filter according to information from the first pressure sensor and the second pressure sensor, and to determine a pressure drop correction factor between the first and second pressure sensors and the fluid filter to account for the respective distances between the first pressure sensor and the fluid filter and between the second pressure sensor and the fluid filter;
   wherein the controller is configured to control operation of the fluid valve according to the condition of the fluid filter and the information from the first pressure sensor and the second pressure sensor; and
   wherein, when a differential pressure between the first and second pressure sensors is less than a predetermined value, then the pressure drop correction factor is determined according to a formula: $0.25+PSI^2$; and when the differential pressure between the first and second pressure sensors is greater than or equal to the predetermined value, then the pressure drop correction factor is determined according to a formula: $PSI-0.5$, wherein PSI is the differential pressure.

2. The fluid system of claim 1, wherein the second pressure sensor is in fluid communication with the fluid filter.

3. The fluid system of claim 1, wherein the first pressure sensor includes a pressure transducer.

4. The fluid system of claim 1, comprising a flow meter in fluid communication with the fluid valve.

5. The fluid system of claim 4, comprising a third pressure sensor, the third pressure sensor in fluid communication with the flow meter.

6. The fluid system of claim 5, comprising a fourth pressure sensor, the fourth pressure sensor in fluid communication with the flow meter, wherein the fourth pressure sensor is disposed downstream of the third pressure sensor.

7. The fluid system of claim 1, wherein the controller is configured to determine at least one of a remaining life of the fluid filter and if the fluid filter has failed.

8. The fluid system of claim 1, wherein the predetermined value is 3 PSI.

9. The fluid system of claim 1, wherein the controller is configured to display a maximum differential pressure, a maximum corrected differential pressure, and a remaining life of the fluid filter.

10. The fluid system of claim 1, wherein the controller is configured to determine the differential pressure according to the information from the first pressure sensor and the second pressure sensor.

11. The fluid system of claim 10, wherein the controller is configured to determine a corrected differential pressure according to the differential pressure and the pressure drop correction factor.

12. The fluid system of claim 11, wherein the controller is configured to close the fluid valve if the differential pressure or the corrected differential pressure are not within one or more limits.

13. The fluid system of claim 10, wherein the controller is configured to detect a complete failure of the fluid filter if the differential pressure is less than a threshold.

14. The fluid system of claim 10, wherein the controller is configured to detect a partial failure of the fluid filter.

15. The fluid system of claim 14, wherein the controller is configured to determine a rate of change of the differential pressure.

16. The fluid system of claim 15, wherein the controller is configured to detect the partial failure of the fluid filter if the rate of change of the differential pressure exceeds a rate threshold.

17. The fluid system of claim 11, wherein the controller is configured to control the fluid valve to throttle fluid flow if the corrected differential pressure is greater than a pressure differential limit.

18. The fluid system of claim 17, wherein the pressure differential limit is about 15 PSI or about 22 PSI.

19. The fluid system of claim 11, wherein the controller is configured to determine the corrected differential pressure, in part, according to a flow rate.

20. A method of controlling a fluid system, the method comprising:
    providing a fluid system, the fluid system including:
       a fluid valve;
       a fluid filter connected to and disposed upstream of the fluid valve;
       a first pressure sensor in fluid communication with the fluid filter, the first pressure sensor disposed upstream of and at a distance from the fluid filter and the fluid valve;
       a second pressure sensor disposed downstream of and at a distance from the fluid filter; and
       a controller;
    determining a differential pressure via the first pressure sensor and the second pressure sensor;
    comparing the differential pressure to a first limit;
    determining a pressure drop correction factor between the first and second pressure sensors and the fluid filter to account for the respective distances between the first pressure sensor and the fluid filter and between the second pressure sensor and the fluid filter;

determining a corrected differential pressure based, in part, on the pressure drop correction factor;

comparing the corrected differential pressure to a second limit;

controlling the fluid valve to reduce the corrected differential pressure if the corrected differential pressure is not within the second limit; and determining a remaining life of the fluid filter if the corrected differential pressure is within the second limit;

wherein, when the differential pressure between the first and second pressure sensors is less than a predetermined value, then the pressure drop correction factor is determined according to a formula: $0.25+PSI^2$; and when the differential pressure between the first and second pressure sensors is greater than or equal to the predetermined value, then the pressure drop correction factor is determined according to a formula: $PSI-0.5$, wherein PSI is the differential pressure, and the predetermined value is 3 PSI.

21. A fluid system, comprising:

a fluid valve;

a fluid filter connected to and disposed upstream of the fluid valve;

a first pressure sensor in fluid communication with the fluid filter, the first pressure sensor disposed upstream of and at a distance from the fluid filter and the fluid valve;

a second pressure sensor disposed downstream of and at a distance from the fluid filter; and a controller configured to determine a condition of the fluid filter according to information from the first pressure sensor and the second pressure sensor, and to determine a pressure drop correction factor between the first and second pressure sensors and the fluid filter to account for the respective distances between the first pressure sensor and the fluid filter and between the second pressure sensor and the fluid filter;

wherein the controller is configured to control operation of the fluid valve according to the condition of the fluid filter and the information from the first pressure sensor and the second pressure sensor; when a differential pressure between the first and second pressure sensors is less than a predetermined value, then the pressure drop correction factor is determined according to a first formula; when the differential pressure between the first and second pressure sensors is greater than or equal to the predetermined value, then the pressure drop correction factor is determined according to a second formula; and the first formula and the second formula are different.

* * * * *